United States Patent [19]
Kakinuma et al.

[11] Patent Number: 5,640,349
[45] Date of Patent: Jun. 17, 1997

[54] FLASH MEMORY SYSTEM

[75] Inventors: Yuji Kakinuma, Saitama; Hiroshi Karibe; Yukio Terasaki, both of Chiba, all of Japan

[73] Assignee: TDK Corporation, Tokyo, Japan

[21] Appl. No.: 588,332

[22] Filed: Jan. 18, 1996

[51] Int. Cl.$^6$ ........................................ G06F 3/08
[52] U.S. Cl. .................. 365/185.33; 365/185.11; 365/230.03; 365/189.05; 365/189.07
[58] Field of Search .............. 365/185.01, 185.11, 365/230.01, 218, 425

[56] References Cited

U.S. PATENT DOCUMENTS

| | | | |
|---|---|---|---|
| 5,291,584 | 3/1994 | Challa et al. | 395/500 |
| 5,293,236 | 3/1994 | Adachi et al. | 348/231 |
| 5,361,228 | 11/1994 | Adachi et al. | 365/189.03 |
| 5,369,754 | 11/1994 | Fandrich et al. | 395/425 |
| 5,418,752 | 5/1995 | Harari et al. | 365/218 |
| 5,430,859 | 7/1995 | Norman et al. | 395/425 |

FOREIGN PATENT DOCUMENTS

| | | |
|---|---|---|
| 5-27924 | 2/1993 | Japan . |
| 6-124175 | 5/1994 | Japan . |

OTHER PUBLICATIONS

"X88C64: Improving Microcontroller Performance with a New E$^2$PROM"; Richard Palm; WESCON/90 Conference Record, Anaheim, CA, 11/13–15/90, pp. 479–483.

"An Experimental Active Memory Based I/O Subsystem"; ASTHANA et al.; Computer Architecture News, Sep. 1994, vol. 22, No. 4, pp. 29–34.

*Primary Examiner*—Viet Q. Nguyen
*Attorney, Agent, or Firm*—Armstrong, Westerman, Hattori, McLeland & Naughton

[57] ABSTRACT

A flash memories (20, 21) are coupled with a host computer (1) through a flash memory controller (2) which has a pair of data buses (27, 28), and a pair of buffer memories (22, 23). Each of said data buses is coupled with a related flash memory, and a related buffer memory, which is coupled with said host computer. Said data buses (22, 23) are controlled to operate simultaneously so that said flash memories are accessed simultaneously in parallel form. A data in said host computer is transferred to said flash memories through said buffer memories and said data buses, and vice versa. All the elements (20, 21, 2) are mounted on a plastics card (100) called a flash memory card, which is coupled with a host computer through a connector. Because of use of a plurality of buses operating in parallel form, the transfer time of data between a host computer and a flash memory card is shortened.

8 Claims, 4 Drawing Sheets

FLASH MEMORY SYSTEM

BACKGROUND OF THE INVENTION

The present invention relates to a flash memory system which is used for a flash memory card having a flash memory as a storage device, and/or an external memory device having a flash memory as a storage medium. When it is used an an external memory device, it operates as if a hard disc device or a floppy disc device in a computer system.

A flash memory system comprises at least a support card, one or plurality of flash memory chips mounted on said card, and a flash memory controller mounted on said chip for controlling operation of said flash memory chips. A flash memory chip is sometimes called an EEPROM, or electrically erasable programmed read only memory.

FIG. 3 shows a block diagram of a prior flash memory controller. In FIG. 3, the numeral 1 is a host computer, 2 is a flash memory controller, 3 is a buffer memory implemented for instance by an S-RAM, 4 is a flash memory chip, 6 is a buffer memory manager, 7 is a flash memory format control, 8 is a host-bus multiplexer, 9 is a buffer memory multiplexer, 10 is a flash memory sequencer, and 12 is an ECC process circuit which functions to process an error of data during transfer between a host computer and a flash memory chip.

(1) Flash Memory Controller

Conventionally, a flash memory card which has a flash memory as a storage device, and an external memory device having a flash memory as a storage medium have been known. The flash memory card, and/or the external memory device has a flash memory controller for controlling a flash memory chip.

A flash memory controller functions to control write/read operation to/from a flash memory based upon a command by a host computer. The flash memory controller controls to write/read a flash memory, by carrying out a transfer control of data, like a hard disk controller.

A flash memory controller has an external buffer memory, through which a write/read operation to/from a flash memory is carried out.

When data is written in a flash memory, the control is as follows. First, data transferred from a host computer is stored in a buffer memory. Then, the data stored in the buffer memory is read out, and after the format process is carried out, the data is transferred to the flash memory. Thus, the write operation into a flash memory is accomplished (the data transfer is carried out through the similar path to that of a hard disk controller).

(2) Prior Flash Memory Controller

As shown in FIG. 3, a flash memory controller 2 is coupled with an external buffer memory 3 and a flash memory 4, and said flash memory controller 2 is coupled with a host computer 1 (which is for instance a personal computer).

A flash memory controller 2 has a host interface control 5, a buffer memory manager 6, and a flash memory format control 7.

The host interface control 5 has a host-bus multiplexer 8, the buffer memroy manager 6 has a buffer memory multiplexer 9, and the flash memory format control 7 has a flash memory sequencer 10 and an ECC process circuit 12 for error process.

Said host interface control 5 sends/receives a control signal for data transfer to/from a host computer 1, so that the host-bus multiplexer 8 operates on time division basis for conversion of a data bus of 16 bits in a host computer 1 to a data bus of 8 bits (which is called a primary bus) in a flash memory controller 2.

Said flash memory format control 7 sends/receives a control signal for data transfer to/from a flash memory 4. In that case, the flash memory sequencer 10 controls an access process to write and/or read the flash memory 4. The flash memory format control 7 carries out the data transfer between the flash memory 4 which has 8 bits data terminal and the 8 bits bus (which is called a secondary bus) in the flash memory controller 2.

Said buffer memory manager 6 switches said primary bus and said secondary bus on time division basis so that one of those buses is coupled with the buffer memory 3.

(3) Operation of a Flash Memory Controller

As described above, a flash memory controller 2 has an external buffer memory 3, as is the case of a hard disk controller, so that the data transfer between a host computer and a flash memory is carried out through said buffer memory.

The data stream is classified to two cases according to data transfer rate.

The first data stream is a stream in a primary bus one end of which is coupled with a host computer, and therefore, the first data stream has data transfer rate which is equal to that of a host computer.

The second data stream is a stream in a secondary bus one end of which is coupled with a flash memory 4, and therefore, the second data stream has data transfer rate which is equal to that of a flash memory 4.

As the transfer rate to a flash memory is slower than that of a host computer, the transfer rate in a secondary bus is slower than the transfer rate in a primary bus. Further, when data is written in a flash memory, a bus is occupied for sending a command and an address to the flash memory, and receiving a status out of the flash memory, and some busy condition of a bus exist to write/read/erase a flash memory for informing an inner condition of the flash memory to the flash memory controller. The data transfer rate must be slow in a flash memory because of above operations.

Said buffer memory 3 is located between two means having the different transfer rate with each other for buffer operation. A plurality sectors data from a host computer is received by said buffer memory simultaneously, therefore, a through-put is apparently increased.

However, a prior flash memory controller has the disadvantages as follows.

(1) A prior flash memory controller has advantage that a through-put is increased as it has an external buffer memory which receives a plurality of sectors from a host computer simultaneously. However, if the capacity of the buffer memory is small, the effect of above is small.

Further, when a host computer issues a write command, data from a host computer is stored temporarily in a buffer memory, and then, the buffer memory is read out so that the data thus read out is transferred to a flash memory. So, it takes some time to write data in a buffer memory and read data out of the buffer memory.

Further, data occupies a buffer memory twice as long as an access time, as two cycles (write cycle and read cycle) are necessary. Therefore, write time to a flash memory must be essentially long.

(2) Conventionally, a host bus multiplexer 8 converts 16 bits parallel data from a host computer to 8 bits parallel data to a primary bus.

Therefore, the transfer rate to a primary bus must be twice as quick as that of a host computer. The operational rate of a buffer memory manager and a write operation of a flash memory must also be twice as quick as that of a host computer. Further, it is requested that an error correction means in a flash memory format control has a priority to interrupt to access a buffer memory.

Thus, a buffer memory is accessed frequently, by an error correction means, a host interface control (lower bit access and higher bit access), a write access to a flash memory, et al. Those accesses to a buffer memory operates on time divisional basis.

A flash memory controller must operate several times as fast as a buffer memory, because of said time divisional operation.

For instance, when a buffer memory is a static RAM with access time 100 nS, the access time to a host computer must be slower than 500 nS. Therefore, an access rate to a flash memory in a prior art is slow.

(3) If we wish to have a fast device for writing/reading data, we must have not only a flash memory with high speed operation, but also a buffer memory with a cash memory with large capacity and short access time.

However, a commercial cash memory with high speed operation has only small capacity, and high cost. Further, as power consumption of the same is high, it is not useful in many situations.

SUMMARY OF THE INVENTION

An object of the present invention is to provide a new and improved flash memory system by overcoming the disadvantages and limitations of a prior flash memory system.

It is also an object of the present invention to provide a flash memory system which provdes high speed operation for writing and reading a data in a flash memory and improves through-put characteristics.

The above and other objects are attained by a flash memory system coupled with a host computer comprising; a plurality of flash memory chips, a flash memory controller for controlling transfer of data between said memory chips and said host computer, said flash memory controller comprising; a plurality of data buses each coupled with a related flash memory for transferring data to/from said flash memory chips, an address buffer coupled with said data buses through gates, to supply address information to said flash memory chips through said data buses, a plurality of buffer memories each coupled with related data bus and said host computer for storing data to be transferred to/from a flash memory chip temporarily, and a flash memory sequencer for controlling said data buses and said buffer memories simultaneously so that a plurality of flash memory chips are accessed simultaneously in parallel form.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1A:
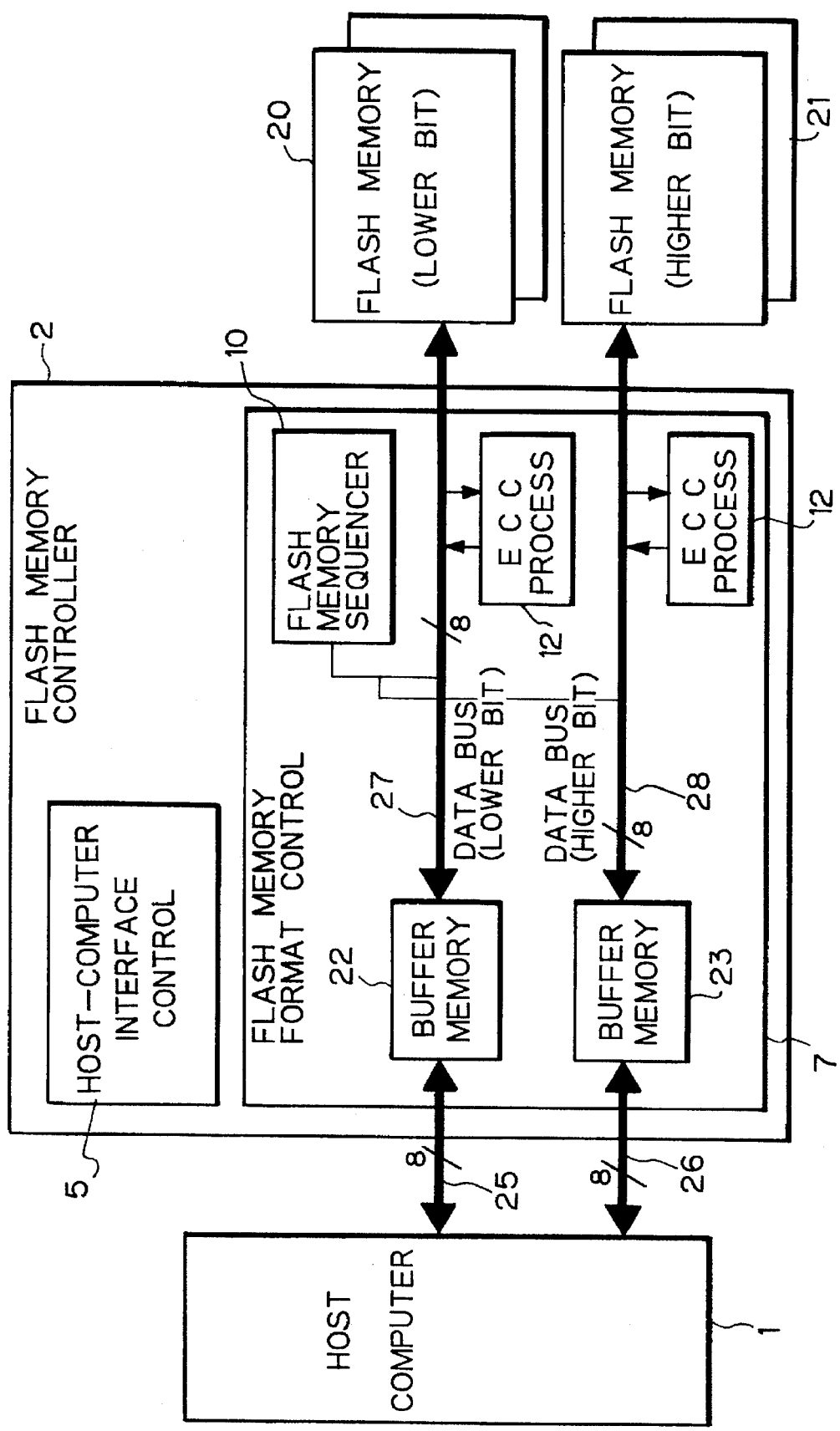
FIG. 1A is a block diagram of a flash memory system according to the present invention.
Figure 1B:
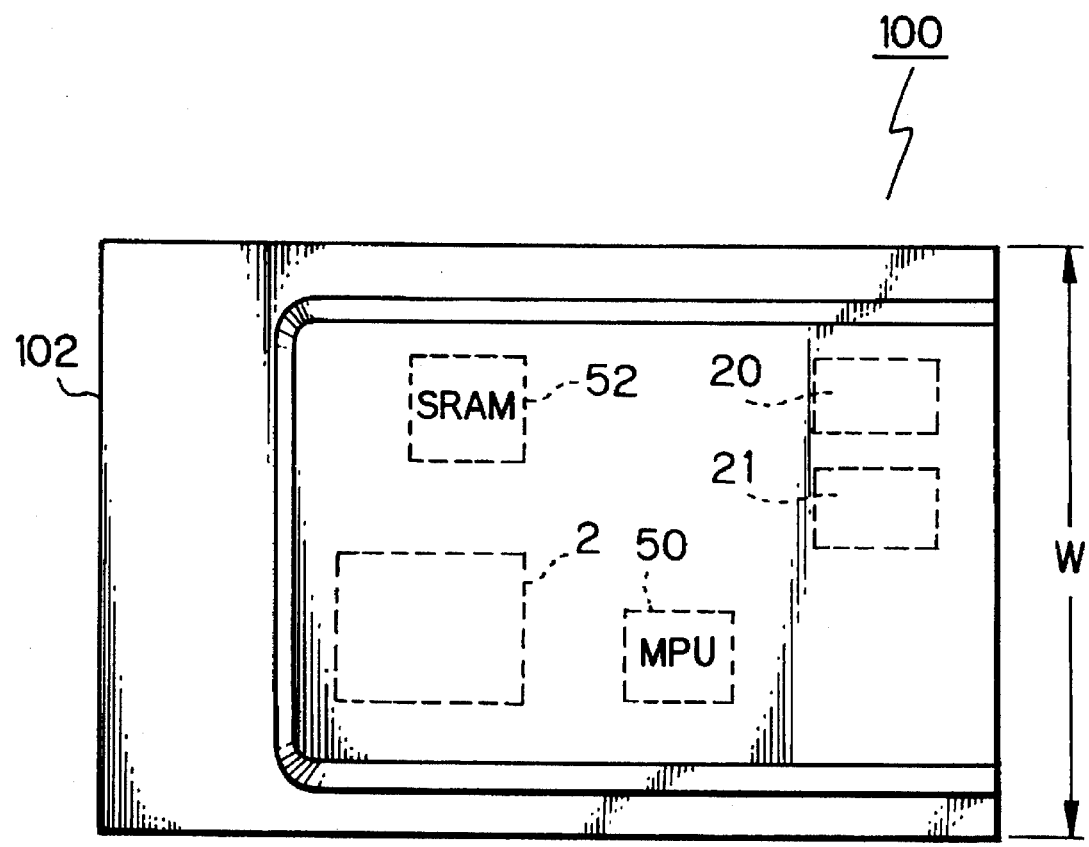
FIG. 1B and FIG. 1C show structure of a flash memory system according to the present invention.
Figure 1C:
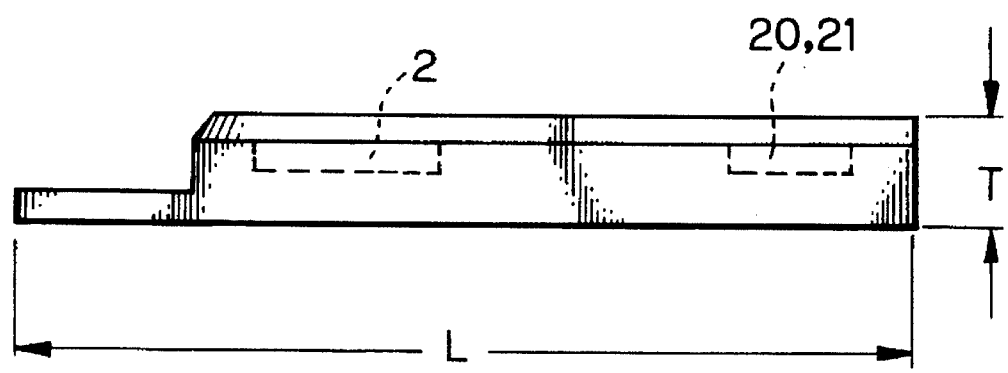
Figure 2:
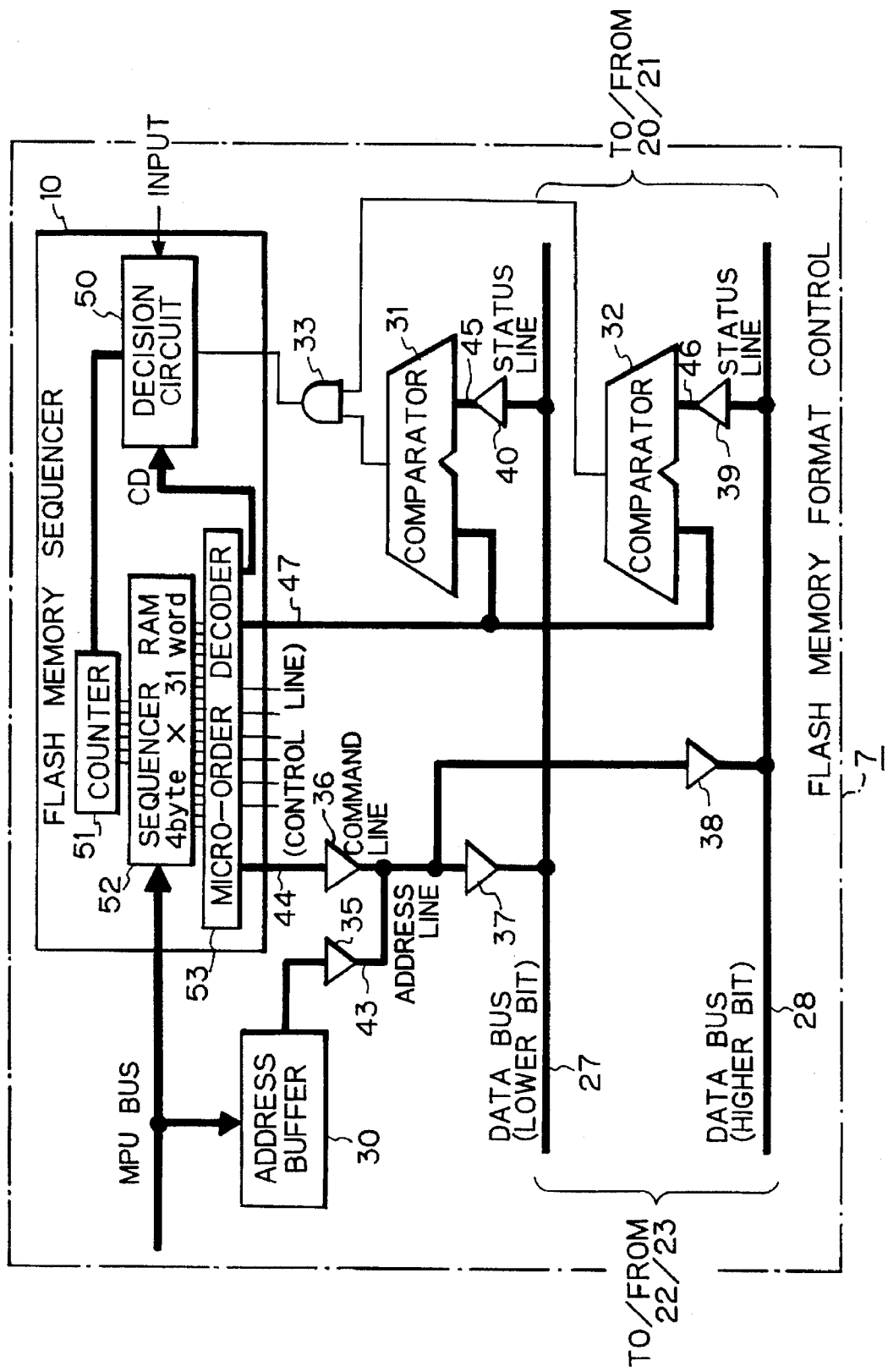
FIG. 2 is a detailed block diagram of a portion in FIG. 1A.
Figure 3:
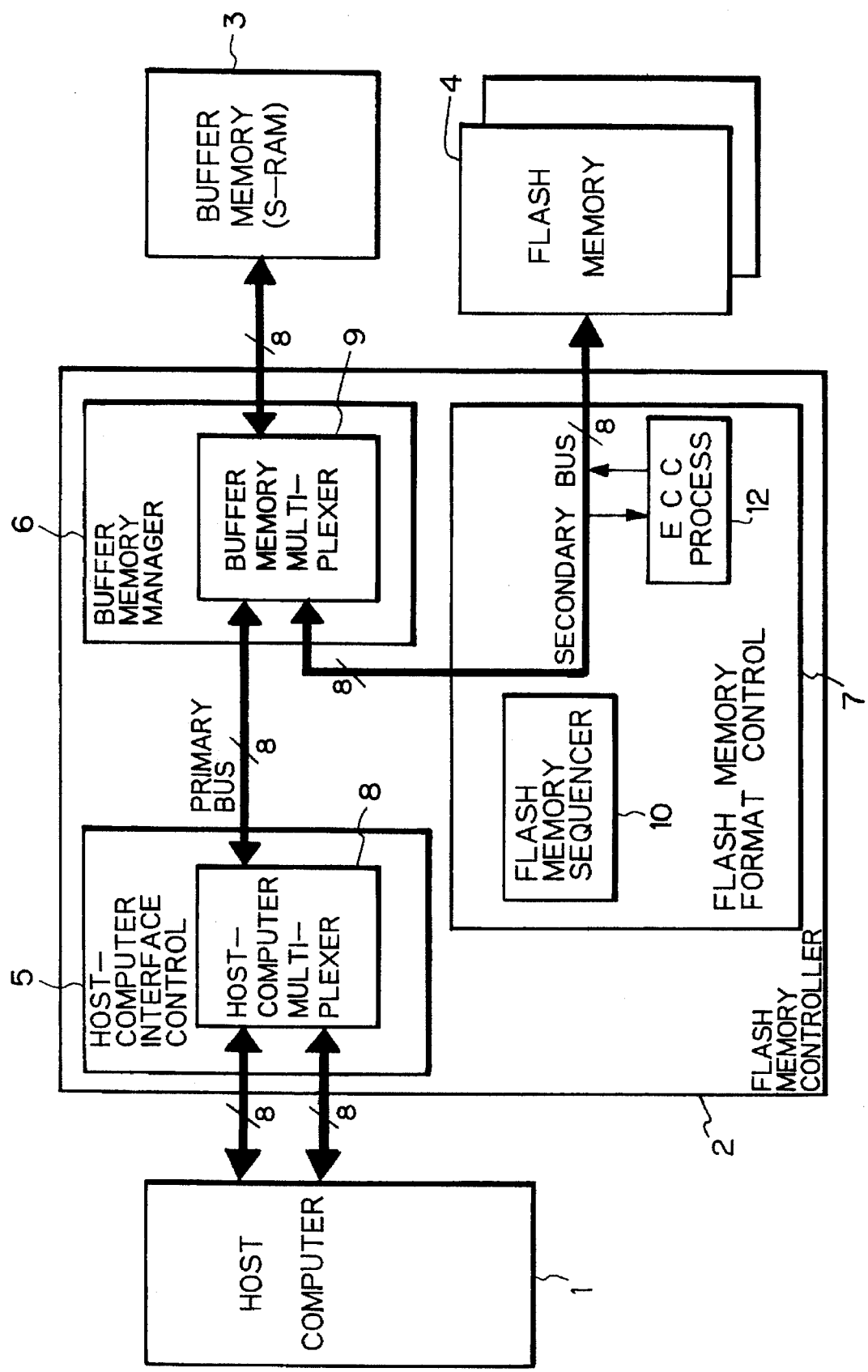
FIG. 3 is a block diagram of a prior flash memory system.

FIG. 1A and FIG. 2 show a block diagram of a flash memory system according to the present invention, and FIG. 1B and FIG. 1C show structure of the flash memory system according to the present invention. In those figures, the numeral 1 is a host computer, 2 is a flash memory controller, 7 is a flash memory format control, 10 is a flash memory sequencer, 12 is an ECC control, 20 is a flash memory chip for lower bits (less significant bits), 21 is a flash memory chip for higher bits (more significant bits). A flash memory chip is sometimes called simply a flash memory in this specification. A flash memory is implemented by an EEPROM (Electrically Erasable Programmed Read Only Memory). The numerals 22 and 23 are a buffer memory, 25 is a data bus for lower bits, 26 is a data bus for higher bits, 27 is a data bus for lower bits, 28 is a data bus for high bits, 30 is an address buffer, 31 and 32 are a comparator, 33 is an AND circuit, 35 is a gate for transferring address information, 36 is a gate for transferring command value, 37 is a gate for transferring lower bits data, 38 is a gate for transferring higher bits data, 39 is a gate for taking higher status, 40 is a gate for taking lower status, 43 is a transmission line for address value, 44 is a transmission line for command value, 45 and 46 are a line for taking status value, 47 is a line for status for comparison, 50 is a decision circuit, 51 is a counter, 52 is a sequencer RAM (random access memory), and 53 is a decoder for micro-orders.

FIG. 1B shows a structure of the present flash memory system. The flash memory system has a plastics support 100. A flash memory controller 2, and flash memory chips 20 and 21 are embedded in said support 100. The support 100 also has a connector 102 for coupling with a host computer. It is possible to mount more than three flash memory chips, although the embodiment in FIG. 1B has two flash memory chips. The support 100 has also a micro processor unit (MPU) 50, and an SRAM memory 52, for controlling operation of the flash memory controller 2 and the flash memory chips 20 and 21. The SRAM memory 52 functions to convert an address from a host computer to an address in a flash memory chip. Those members 50 and 52 are not shown in FIG. 1A, as they are conventional, and no concern with the present invention.

In a typical embodiment, the size of the flash memory card in FIG. 1B is 85.6 mm for length L, 46 mm for width W, and 5 mm for thickness T, and each flash memory chip has the capacity of 2 mega bytes, each having 8 bits, so that a pair of chips provides 4 mega bytes each having 8 bits, or 2 mega words each having 16 bits.

[1] Structure of the Embodiment (FIG. 1A)

FIG. 1A is a block diagram of a flash memory system according to the present invention. In the embodiment, a flash memory chip 20 and 21 is a NAND type flash memory chip, which is controlled by the flash memory controller for write, read, erase, and/or read-status operation.

As shown in FIG. 1A, the flash memory controller 2 is coupled with a pair of external flash memory chips 20 and 21, each stores data for lower bits (less significant bits), and data for higher bits (more significant bits). The flash memory controller 2 is also coupled with a host computer 1.

The flash memory chip 20 for lower bits and the flash memory chip 21 for higher bits may have a plurality of flash memory elements (flash memory group), so that those flash memory elements are independently operate to write, read, erase and/or read-status. In the embodiment, each of the flash memory chip 20 and 21 has 8 bits, and each flash memory element has one bit. It is assumed that a word in a host computer has 16 bits which are separated to 8 bits of higher bits, and 8 bits of lower bits in said flash memory chips.

An NAND type flash memory chip has no address terminal, but a storage area is selected in an inner memory by supplying 3 bytes address information to a data terminal.

The flash memory controller 2 has a host interface control 5, and a flash memory format control 7.

The flash memory format control 7 has a flash memory sequencer 10, a lower bit bus 27, an upper bit bus 28, a buffer memory (for a host computer) 22 and 23, and an ECC process 12.

The flash memory controller 2 has a micro processor MPU, and an SRAM (not shown in the figure) for control of an inner operation of the flash memory controller.

The function of said members is as follows.

(1) A host interface control 5 sends and receives a control signal to and from a host computer 1, and the operation is similar to that of a conventional hard disk device.

(2) A lower bit bus 27 transfers lower 8 bits among 16 parallel bits sent to/from a host computer 1.

(3) A higher bit bus 28 transfers higher 8 bits among 16 parallel bits sent to/from a host computer 1.

(4) A buffer memory 22 stores lower 8 bits among 16 parallel bits sent to/from a host computer 1, when data are transferred to/from a host computer from/to a flash memory system. The operation of the buffer memory 22 is controlled by a control (not shown) in the flash memory format control 7.

(5) A buffer memory 23 stores higher 8 bits among 16 parallel bits sent to/from a host computer 1, when data are transferred to/from a host computer from/to a flash memory system. The operation of the buffer memory 23 is controlled by a control (not shown) in the flash memory format control 7.

(6) An ECC process 12 functions to ECC process (error correction code), including an ECC coding and an ECC decoding, for a data written and read.

(7) A flash memory sequencer 10 controls the lower data bus 27 and the higher data bus 28 simultaneously, so that the flash memory chip 20 for lower bits and a flash memory chip 21 for higher bits are accessed simultaneously.

[2] Operation of a Flash Memory Controller

The data transfer between a host computer 1 and a flash memory chip 20 for lower bits data and a flash memory chip 21 for higher bits data is carried out in the form of parallel data having 16 bits. In that case, higher 8 bits and lower 8 bits among said 16 parallel bits are transferred separately but simultaneously in the flash memory controller 2.

When a data is written in a flash memory chip, a data from a host computer 1 is transferred to the flash memory controller 2 in the form of 16 bits of parallel data through a data bus 25 which has 8 bits and a data bus 26 which has 8 bits.

The flash memory controller 2 stores 16 bits parallel data from the host computer in a pair of buffer memories 22 and 23 separately so that each buffer memory stores 8 bits. The lower 8 bits data among 16 bits of parallel data is stored in the buffer memory 22, and the higher 8 bits data is stored in the other buffer memory 23.

The data stored in the buffer memory 22 is transferred to the flash memory chip 20 for lower bits data through the data bus 27 for lower bits. The data stored in the buffer memory 23 is transferred to the flash memory chip 21 for higher bits data through the data bus 28 for higher bits.

When data is read out of the flash memory chips 20 and 21, the data is transferred in the opposite direction of said data transfer. In other words, the data (8 bits) read out of the flash memory chip 20 for lower bits is stored in the buffer memory 22 through the lower bits data bus 27, and the data (8 bits) read out of the flash memory chip 21 for higher bits is stored in the buffer memory 23 through the higher bits data bus 28. The transfer of a pair of data in the data buses 27 and 28 is carried out simultaneously, as if 16 bits parallel data is transferred. Then, the data stored in the buffer memories 22 and 23 is transferred to the host computer 1 through the data buses 25 and 26.

As described above, a pair of flash memory chips each having 8 bits data are accessed at the same time so that 16 bits of data is accessed in parallel form.

The control of said flash memory chips 20 and 21 is carried out by the flash memory sequencer 10. The control of the buffer memories 22 and 23 is carried out by a control (not shown) in the flash memory format control 7.

[3] Flash Memory Format Control (FIG. 2)

FIG. 2 shows in detail a part of FIG. 1A. A flash memory format control is now described in accordance with FIG. 2.

A flash memory format control 7 comprises further an address buffer 30, an AND circuit 33, comparators 31 and 32, a gate 35 for transferring address value, a gate 36 for transferring command value, a gate 37 for transferring lower bit data, a gate 38 for transferring higher bit data, a gate 39 for taking higher bit status, a gate 40 for taking lower bit status, a line 43 for address value, a line 44 for command value, lines 45 and 46 for taking status value, and a line 47 for transferring status to comparators, et al.

A flash memory sequencer 10 has a decision circuit 50, a counter 51, a sequencer RAM 52, and a micro order decoder 53. Further, the flash memory sequencer 10 produces various control signals, command values, and comparison values which are supplied to various members so that said flash memory chip 20 for lower bit data and another flash memory chip 21 for higher bit data are accessed simultaneously.

Said address buffer 30 is coupled with an MPU (micro processor unit, not shown) through an MPU bus so that address information of a flash memory chip sent from said MPU is temporarily stored in said address buffer 30, and said address information is read out of the buffer memory one by one to flash memory chips 20 and 21.

The operation of FIG. 2 is now described.

The typical operation of a flash memory system is "write" a flash memory, "read" a flash memory, "erase" a flash memory, and "read-status" of a flash memory. The read-status operation is carried out immediately after "write" operation to see if the "write" operation is carried out normally or not.

(1) "Write", "Read", or "Erase" Command

The line 44 for command value transfers a command value generated in the flash memory sequencer 10 to the flash memories through the gate 36 to indicate one of the command values ("write", "read", et al). The command value line 44 has 8 parallel bits. Said command is used to access flash memories.

The line 43 for address value transfers the address value which is output of the address buffer 30 to the flash memories through the gate 43 for address value. The address value is used to access the flash memories.

When a data is transferred between a host computer and a flash memory system, the address of the flash memory is provided by the MPU and the SRAM (static RAM) which has a conversion table between a host computer address and flash memory address. The address read out of the SRAM is temporarily stored in the address buffer 30, which is then read out, and is sent to the flash memory chip through the gates 37 and 38 and the data buses 27 and 28.

Said command value and said address value are sent to the data bus 27 for lower bits through the gate 37 for lower bit, and to the data bus 28 for higher bits through the gate 38 for higher bit.

Then, the command value and the address value on the data bus 27 are transferred to the flash memory 20 for lower bits, and the command value and the address value on the data bus 28 are transferred to the flash memory 21 for higher bits. In the embodiment, command value and address value are transferred through a common data bus.

It should be noted in the above explanation that when a flash memory system operates in "write" operation, a command which designates "write" operation is first sent to a flash memory chip, then, an address value designating the address of the flash memory chip in said operation is sent to the flash memory chip from the address buffer 30, and then, data related to said address sent to the flash memory is sent to the flash memory from the buffer memories 22 and 23 which are coupled with the host computer 1. When the command is "read" command, the direction of data is opposite to that of "write" command. When the command is "erase" command, no data is transferred.

The flash memories 20 and 21 are accessed simultaneously in parallel form according to a command value and an address value on the data buses 27 and 28.

(2) "Read-status" Command

When a "write" command is carried out, a flash memory chip puts on a flag which shows whether a write operation is carried out correctly or not. The flag is read out by using a read-status command. Therefore, a flash memory controller carries out a read-status command immediately after a write command to see whether the immediate write command is carried out correctly or not.

A pair of comparators 31 and 32 are used to compare status values so that the flash memory sequencer 10 recognizes the result of the access to the flash memories 20 and 21.

A reference status generated in the flash memory sequencer 10 is sent to the first input of the comparators 31 and 32 through the line 47. The reference status indicating the correct "write" operation is for instance "000".

The other input of the comparator 31 receives a status value from the flash memory 20 through the data bus 27 and the gate 40 for lower bits, and the other input of the comparator 32 receives a status value from the other flash memory 21 through the data bus 28 and the gate 39 for higher bits.

The comparators 31 and 32 compare two status values, respectively. When two status values coincide with each other, each of the comparators outputs high level signal 1, otherwise, outputs low level signal 0.

The AND circuit 33 produces logical product of outputs of two AND circuits 31 and 32. Therefore, when both comparator 31 and 32 output high level signal, the AND circuit 33 provides high level signal, which is sent to the decision circuit 50. The high level signal of the output of the AND circuit 50 indicates that both the lower 8 bits and the higher 8 bits are written in the flash memories correctly.

The decision circuit 50 recognizes that the access to the flash memories 20 and 21 has succeeded, when the output of the AND circuit 33 is in high level, but recognizes that the access has failed when said output is in low level.

The decision circuit 50 further receives a command CD from the micro-order decoder 53, and an INPUT from the flash memories. The command CD instructs the decision circuit 50 to operate, and the signal on the INPUT terminal is active when both the flash memories are in ready status but not busy status. So, the decision circuit 50 provides a high level output only when the AND circuit 33 outputs a high level output, the command CD is active, and the signal on INPUT is active.

The output of the decision circuit 50 is applied to the counter 51 so that the content of the counter 51 is switched according to the output of the decision circuit 50.

[4] Flash Memory Sequencer

The flash memory sequencer 10 comprises a counter 51, a sequencer RAM 52, a micro order decoder 53, and a decision circuit 50, in order to produce control signals for controlling flash memories 20 and 21.

The necessary operation of the flash memory system is sent to the sequencer RAM 52 by the MPU through the MPU bus, and the operation of the flash memory sequencer begins.

At initial stage, the content of the counter 51 is zero. The content of the counter 51 is incremented one by one, or switched to a predetermined value according to an output of the decision circuit 50. The content of the counter 51 is applied to the sequencer RAM 52, which has 4 bytes×32 words, and outputs a command signal for operating flash memory chips according to the address supplied by the counter 51. The sequencer RAM 52 stores the codes for access the flash memories, and the address zero of the sequencer RAM 52 stores a micro code of 4 bytes for initiating the flash memories.

Therefore, when the counter 51 sends address zero to the sequencer RAM 52, the address zero of the sequencer RAM 52 is read out, and the micro code thus read out of the address zero for initiating the flash memories is sent to the micro order decoder 53.

The micro order decoder 53 produces various control signals, command values, and reference values for comparison, et al based upon the micro codes from the sequencer RAM 52.

As the counter 51 is incremented, the similar operation is carried out in the sequencer RAM 52, and the micro code decoder 53.

Thus, according to the content of the counter 51, the sequencer RAM 52 provides the micro code according to the content of the counter 51, and the micro-order decoder 53 provides the necessary signals for operation of each circuits in the flash memory controller and the flash memory chips.

Some modifications are possible to those skilled in the art in the present invention. Some of them are;

(1) The above embodiment uses an NAND type flash memory chip. It should be noted of course that another type of flash memory chip is available in the present invention.

(2) The buses for lower bits and higher bits are not restricted to an 8 bit bus, but a 16 bit bus, or any number of bits are possible for a flash memory. In that case, a bus must comply with a format of a flash memory chip.

(3) The above embodiment provides a 16 bits parallel bus by 8 bits of lower bit data bus and 8 bits of higher bit data bus. It should be appreciated of course that a parallel bus of 32 bits is possible by using 4 data buses each having 8 bits, and a parallel bus of 64 bits is possible by using 8 data buses each having 8 bits.

Finally, some effects of the present invention are enumerated.

(1) The flash memory controller has a pair of data buses, and a pair of buffer memories, and has no external buffer memory which a prior art has. So, a 16 bits parallel data from a host computer is transferred directly to flash memory chips without being transferred to an external buffer memory.

Further, a 16 bit data to a host computer is also transferred directly to a host computer. So, no data transform is necessary, and fast operation to write/read a flash memory is accomplished.

(2) A data from a host computer is temporarily stored in a buffer memory in a flash memory controller. Therefore, a through-put is improved by the presence of said buffer memory.

(3) A pair of data buses in a flash memory controller access simultaneously flash memory chips so that a pair of flash memory chips are accessed at the same time. So, the operation speed to a flash memory is improved.

(4) A buffer operation is accomplished by an inner buffer memory in a flash memory controller. Therefore, an access time to a flash memory is shortened as compared with a prior art which has an external buffer memory. Also, a through-put to read a flash memory is improved.

(5) A flash memory controller has a 16 bits parallel bus so that no time division operation is necessary as is the case in a prior art. So, the speed to write/read a flash memory is improved.

From the foregoing, it will now been apparent that a new and improved flash memory system has been found. It should be understood of course that the embodiments disclosed are merely illustrative and are not intended to limit the scope of the invention. Reference should be made, therefore, to the appended claims rather than the specification as indicating the scope of the invention.

What is claimed is:

1. A flash memory system coupled with a host computer comprising:

a plurality of flash memory chips, and a flash memory controller for controlling transfer of data between said memory chips and said host computer, said flash memory controller comprising a plurality of data buses each coupled with a related flash memory chip for transferring data to/from said flash memory chips, an address buffer coupled with said data buses through gates, to supply address information to said flash memory chips through said data buses, a plurality of buffer memories each coupled with a related data bus and said host computer for storing data to be transferred to/from a flash memory chip temporarily, a flash memory sequencer for controlling said data buses and said buffer memories simultaneously so that a plurality of flash memory chips are accessed simultaneously in parallel form, a plurality of comparators for comparing status information supplied by a related flash memory chip with predetermined reference information, and an AND circuit for providing logical AND operation for outputs of said comparators so that said AND circuit provides a positive output signal only when all the flash memory chips operate correctly in a previous operation.

2. A flash memory system according to claim 1, wherein a number of said data buses, said flash memory chips, said buffer memories, and said comparators is two.

3. A flash memory system according to claim 1, wherein data in each of said data bus is in parallel form.

4. A flash memory system according to claim 1, wherein each of said data bus transfers not only data, but also address and command to a flash memory chip.

5. A flash memory system according to claim 1, said flash memory sequencer comprises a counter, a sequencer RAM which stores instructions at an address which is indicated by said counter, an instruction decoder coupled with said sequencer RAM for decoding a instruction so that a decoded micro order is sent to a flash memory chip through said data bus, and a decision circuit which adjusts content of said counter depending upon an output of said AND circuit.

6. A flash memory system according to claim 1, wherein each of said flash memory chips has 8 bits in each address.

7. A flash memory system according to claim 1, further comprising a support card on which said flash memory chips, and said flash memory controller are mounted, and said support card has a connector which is connected to a host computer.

8. A flash memory controller for controlling transfer of data between flash memory chips which are coupled with said controller and a host computer, comprising:

a plurality of data buses each coupled with a related flash memory chip for transferring data to/from said flash memory chips, a plurality of buffer memories each coupled with a related data bus and said host computer for storing data to be transferred to/from a flash memory chip temporarily, and a flash memory control for controlling said data buses and said buffer memories simultaneously so that a plurality of flash memory chips are accessed simultaneously, including a plurality of comparators for comparing status information supplied by a related flash memory chip with predetermined reference information, and an AND circuit for providing logical AND operation for outputs of said comparators so that said AND circuit provides a positive output signal only when all the flash memory chips operate correctly in a previous operation.

* * * * *